May 14, 1929.  W. HARMS  1,712,613
CHICKEN FEEDER AND EXERCISER
Filed April 16, 1927  3 Sheets-Sheet 1

May 14, 1929.   W. HARMS   1,712,613
CHICKEN FEEDER AND EXERCISER
Filed April 16, 1927   3 Sheets-Sheet 3

Inventor
Walter Harms
By Clarence A. O'Brien, Attorney

Patented May 14, 1929.

1,712,613

UNITED STATES PATENT OFFICE.

WALTER HARMS, OF SHEBOYGAN, WISCONSIN.

CHICKEN FEEDER AND EXERCISER.

Application filed April 16, 1927. Serial No. 184,309.

The present invention relates to improvements in feeding devices for chickens and has for its principal object to provide a device which is automatically operated by the fowl for effecting the distribution of the feed and simultaneously causing the fowl to exercise whenever attempting to obtain a quantity of feed.

One of the important objects of the present invention is to provide a chicken feeder and exerciser which includes a means for delivering a predetermined quantity of feed from a supply hopper onto the rigid plate, additional means being provided for scattering the feed deposited on the plate onto the ground in order that the poultry may obtain the feed, the aforementioned means being operated by the weight of the fowl stepping upon a depressible bar, which bar is operatively connected with the aforesaid means.

A further object is to provide a chicken feeder and exerciser of the above mentioned character which will at all times be positive and efficient in its operation, the same being further simple in construction, inexpensive, strong and durable and further well adapted to the purpose for which it is designed.

Other objects and advantages of the invention will become apparent during the course of the following description taken in connection with the accompanying drawings.

In the accompanying drawings forming part of this application:

Figure 5 is a vertical sectional view through the discharge end of the feed hopper and the compartment arranged therebelow, showing the ratchet feed distributor and the deflector member, and Figure 6 is a top plan view of the feed deposit plate showing the scattering means secured on the rotatable shaft and the upstanding pins on the plate with which the scattering member cooperates.

Figure 1:
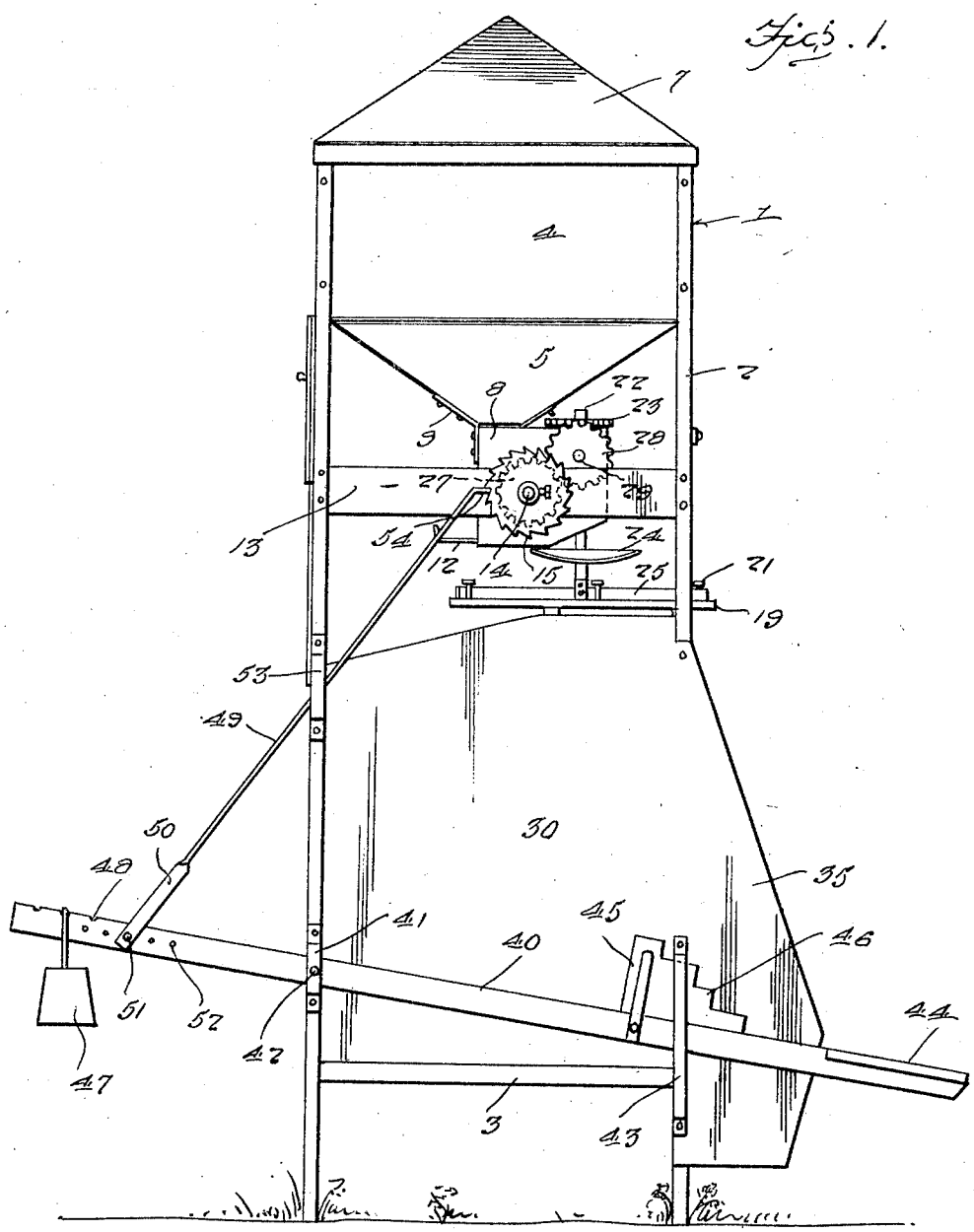
Figure 1 is a side elevation of the chicken feeder and exerciser embodying my invention.

In the drawings wherein for the purpose of illustration is shown the preferred embodiment of my invention, the numeral 1 designates generally the frame of my improved chicken feeder and exerciser, the same comprising the angle iron corner posts 2, between which extend suitable braces shown at 3.

A feed containing hopper 4 is supported in the top of the frame 1 and this hopper is provided with a conical bottom 5, the smaller end of which is open to provide a discharge opening 6 in the manner as more clearly disclosed in Figure 5 of the drawings. A removable cover 7 is provided for the open top of the hopper 4.

A substantially rectangular shaped compartment 8 which is open at its front and bottom side is arranged below the discharge opening 6 of a hopper 4 and is supported in proper position with respect to the discharge opening by the bracket 9. The top 10 of this compartment is provided with an opening 11 adjacent the rear side of the compartment and this opening 11 provides an inlet for communication with the outlet or discharge opening 6 whereby the feed within the hopper 4 may be discharged therefrom through the opening 6 into the compartment 8. A slide 12 normally closes the rear portion of the open bottom of the compartment as is clearly disclosed in Figure 5.

Extending transversely through the sides of the compartment 8 and through the cross bars 13 which are secured between the front and rear corner posts of the frame 1 is the rotatable shaft 14. The ends of this shaft project beyond the sides of the frame and secured thereon are the ratchet wheels 15 and the purpose thereof will be presently described.

Secured on the intermediate portion of the shaft 14 and arranged within the compartment 8 is the ratchet feed wheel 16 which provides a distributor for the feed and the ratchet wheel 16 is so arranged within the compartment 8 as to have its teeth adapted for vertical alignment with the openings 6 and 11 so that the feed discharged from the hopper into the compartment will drop onto certain of the teeth 17 of the ratchet distributor wheel 16 in the manner obvious from the construction shown in Figure 5.

An adjustable slide plate 18 is secured on the front side of the conical bottom portion 5 of the hopper 4 and the lower end of this slide plate extends downwardly into the compartment 8 through the opening 11 for regulating the flow of the feed into the compartment.

An enlarged circular feed deposit plate 19 is rigidly secured on a pair of parallel spaced supporting bars 20 so that said plate will be disposed below the open forward end of the compartment 8. A series of headed pins 21 extend upwardly from the upper face of this plate 19 at spaced intervals and the purpose of these pins will be hereinafter more fully described.

Figure 4:
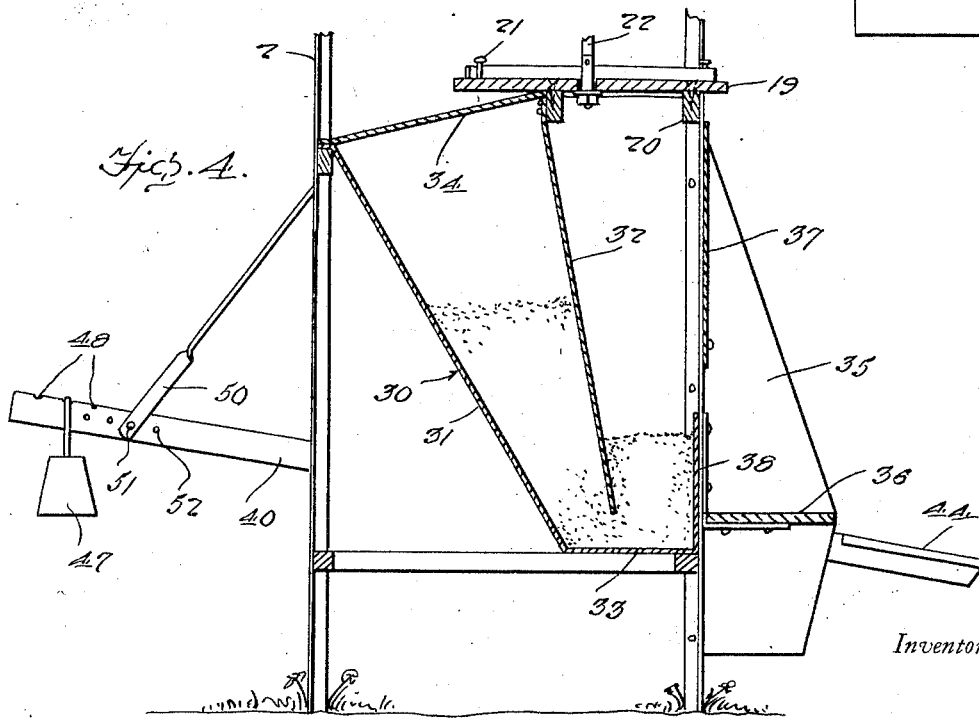
Figure 4 is a vertical sectional view through the mash container hopper and through the rigid feed deposit plate.

A vertical rotatable shaft 22 extends downwardly through the open front side of the compartment A and the lower end of this shaft extends through an enlarged opening provided therefor in the rigid distributor plate 19 in the manner more clearly shown in Figure 4. A gear wheel 23 is secured on the upper end of this shaft and the manner in which the shaft is rotated will be presently described. Secured on this shaft 22 and located directly below the lower open forward end of the compartment 8 is the deflector plate 24, the sides thereof being bent downwardly. This deflector plate is of a diameter much smaller than the diameter of the rigid distributor plate 19 and the purpose of this deflector plate is to provide a means whereby the feed which is carried by the teeth 17 of the ratchet wheel 16 will fall on the deflector plate and due to its shape, the feed will drop onto the distributor plate 19. The deflector plate will tend to distribute the feed toward the outer edge portion of the stationary distributor plate 19 and thereby prevent the dropping of the feed onto the central portion of the rigid distributor plate.

Forming a salient feature of the present invention is the blade 25 which is formed from a strip of spring metal and this blade is secured to the shaft 22 by any appropriate fastening means such as is shown at 26 in such a manner as to have the lower edge of the blade engaging the upper surface of the rigid distributor plate 19 and the blade 25 is further of such length as to have its ends adapted to engage the spaced upstanding headed pins 21 in the manner clearly shown in Figure 6.

The blade 25 will cooperate with the headed pins 21 in scattering the feed deposited on the rigid plate 19 onto the ground when the shaft 22 is rotated as will be also presently described. By providing the upstanding pins 21 and the blade 25, said blade will be placed under tension when coming in contact with the pins so that immediately upon leaving the pins the free ends of the blade will exert such force as to cause the scattering of the feed deposited on the plate 19 over a wide area. If the pins were not provided, the blade 25 would merely scrape over the upper surface of the plate and not force the feed onto the ground a considerable distance away from the base of the feeder.

The distributor ratchet wheel 16 will operate simultaneously with the rotatable shaft 22 through the medium of the gears 27 and 28, respectively, these gears being disposed in intermeshing relation. The gear 27 is secured on the shaft 14 while the gear 28 is mounted on the outer end of a suitable shaft 29 which extends transversely across the forward portion of the compartment 8. The gear 28 in turn engages the gear 23 secured on the upper end of the shaft 22 and this construction is clearly disclosed in Figure 1.

A mash containing receptacle 30 is supported in the lower portion of the frame 1 and the rear wall 31 of this receptacle is inclined downwardly toward the front of the receptacle.

A partition 32 is arranged within the receptacle 30 and the lower edge of this partition is spaced from the bottom 33 in the manner clearly shown in Figure 4 whereby to regulate the distribution of the mash from the rear portion of the receptacle to the front portion thereof. A lid or cover 34 is provided for the open top of the container or receptacle 30 and when the lid is removed, the receptacle may be filled with mash. Also by removing the lid or cover 34, and moving the slide 12 outwardly, feed may be deposited from the compartment 8 and the hopper 4 into the receptacle 30 in an obvious manner. The sides of the receptacle extend outwardly beyond the front side of the frame 1 as shown at 35 with reference more particularly to Figures 1 and 4 and supported between the outwardly projecting portions 35 at the sides of the receptacle adjacent the bottom thereof is the platform 36 on which the fowls may stand while eating the mash. The front side of the receptacle is open and a plate 37 extends across the upper portion of the front side, while a removable plate section 38 is disposed across the front side of the lower portion of the receptacle, and the upper edge of this lower plate section 38 is spaced with respect to the lower edge of the upper plate section 37 in order to provide an entrance 39 whereby access to the mash in the receptacle may be readily obtained by the fowl standing upon the platform 36.

Figure 2:
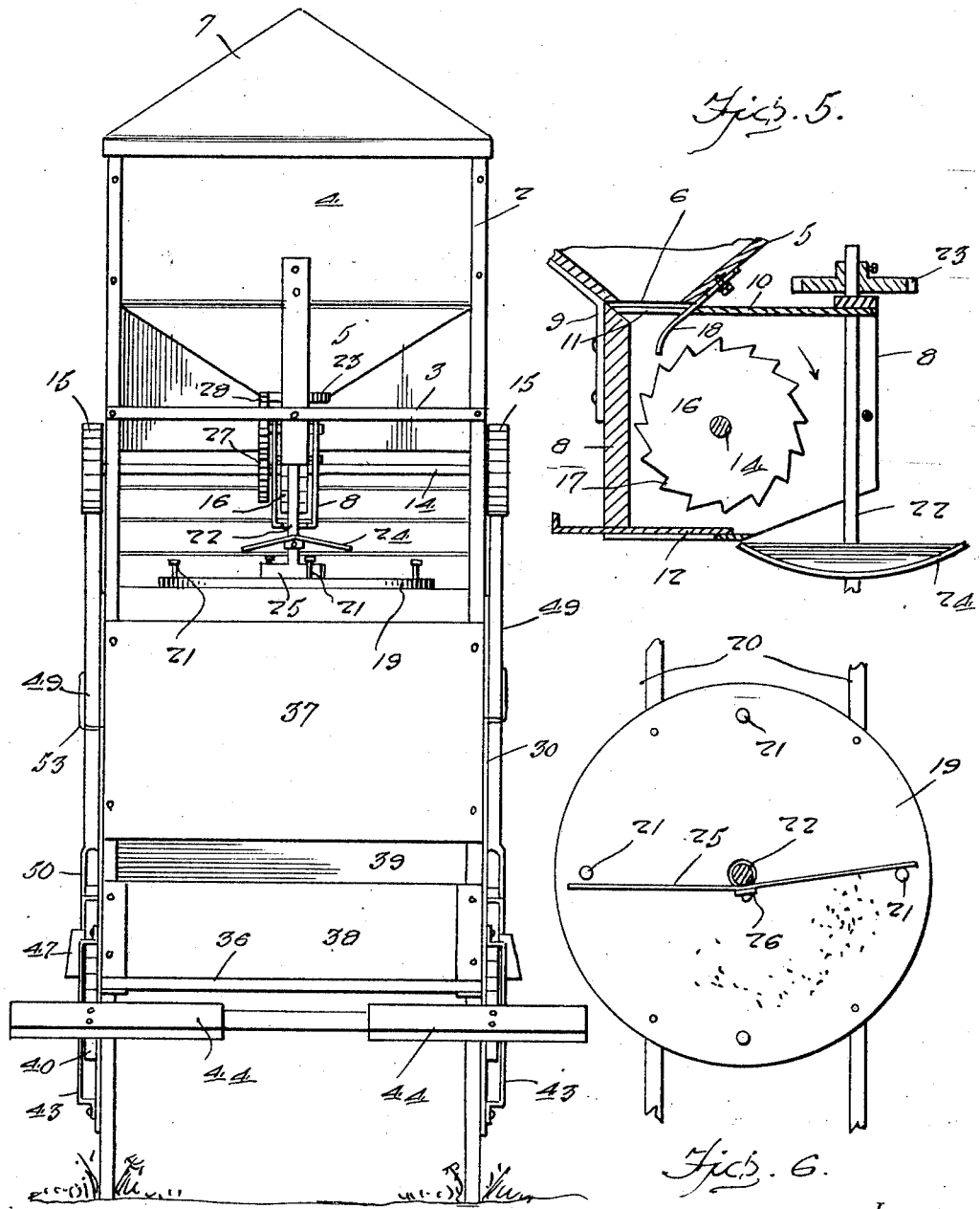
Figure 2 is a front elevation thereof.
Figure 3:
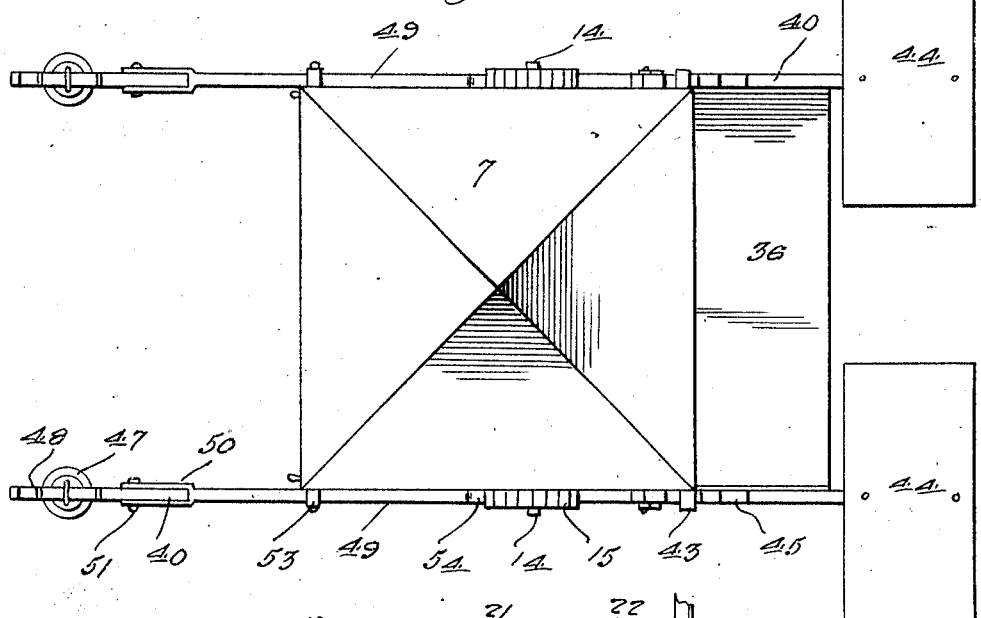
Figure 3 is a top plan view.

The operating means for actuating the rotatable shafts 14 and 22, respectively, comprises a pair of elongated bars 40 which are disposed on the opposite sides of the lower portion of the frame 1, the inner or rear portion of each bar extends through a suitable bracket 41 provided therefor on the rear corner post, and each bar is pivoted in its respective bracket adjacent its inner or rear end as indicated at 42. The larger bracket 43 similar to the bracket 41 is secured on the outer face of each of the sides of the mash containing receptacle 30 adjacent the forward corner posts 2 of the frame 1, and the forward free ends of the bars 40 extend through the brackets in the manner clearly shown in the drawings. A treadle 44 is secured on the forward end of each of the pivoted bars 40, and this is clearly shown in Figure 2.

Secured on the upper edge of each pivoted bar 40 is a block 45 formed with a plurality of vertically spaced notches 46 and this block is operable within the respective bracket 43 so that the bracket will cooperate with the several notches 46 in the blocks 45 for limiting the swinging movement of the bars in one direction. A counter weight 47 is supported on the inner or rear end of each bar 40 for normally urging the forward end of the bar upwardly so that one of the notches 46 in each block will engage the upper portion of the respective bracket 43. The upper edge of the rear end of each bar is formed with spaced notches 48 in order to permit the counter weight to be adjustably disposed on the rear end of each bar in the manner as clearly disclosed in Figure 1. An elongated bar or pawl carrying member 49 is provided at its lower end with a fork 50 which straddles the rear end portion of each bar 40 and a pivot pin 51 extends through the free ends of the arms of the fork 50 and through one of the openings 52 formed in the bar 40 whereby the lower end of each bar 49 will be operatively connected to the rear end of the respective bars 40. Suitable guide brackets 53 are secured on the intermediate portions of the rear corner posts to accommodate the intermediate portions of the bars 49.

The upper end of each bar 49 is bent to form a dog or pawl 54 for cooperation with the respective ratchet wheels 15 secured on the outer ends of the rotatable shaft 14.

The operation of my improved chicken feeder and exerciser may be briefly stated as follows: Normally the parts are arranged as shown in Figure 1, and the block 45 is adjustably secured on each bar so that the predetermined notch 46 may be disposed for cooperation with the bracket 43 in order to regulate the number of teeth which the pawl 54 of the bar 49 will pass over so as to regulate the distance the distributor ratchet wheel 16 will rotate. When a fowl steps upon the treadle 44, the weight of the fowl will result in the bar 40 swinging downwardly on its pivot 42 and the rear end of this lever will swing upwardly, thus causing the bar 49 to have its ratchet engaging pawl or dog 54 cooperate with the ratchet wheel in rotating the same and the shaft 14 and during such rotation, the shaft 22 will also be actuated through the medium of the gearing heretofore described, and the quantity of feed carried by the teeth of the distributor ratchet member 16 will be discharged onto the deflector plate 24 and the latter will in turn deflect the feed onto the deposit plate 19, and as the shaft 22 rotates, the spring blade 25 will cooperate with the upstanding headed pins 21 to scatter the feed which has been deposited on the plate 19 onto the ground where the chickens may readily obtain the same. As soon as the fowl steps off of the treadle 44, the weight 47 will automatically return the bar 40 and the bar 49 to their normal position where the same will again be set for further operation by the next fowl to step upon either of the treadles 44.

The provision of a chicken feeder and exerciser of the above mentioned character will permit poultry to exercise while feeding which is very essential in the raising of poultry and furthermore the provision of a chicken feeder of this character will obviate the necessity of having to employ an attendant to feed the chickens. Also, a device of this character will at all times be positive and efficient in its operation as well as automatic in supplying feed for consumption by the fowls.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. In a chicken feeder and exerciser of the class described, a frame, a feed hopper supported in the top of the frame, the bottom of the hopper being provided with a discharge opening, a compartment open at its front side and supported below the hopper and adapted for communication with the discharge end thereof, a toothed feed re-receiving wheel adapted for rotation within the compartment, a feed deposit plate supported on the frame below the discharge end of the compartment and onto which the feed is deposited after being discharged from the toothed wheel in the compartment, means for scattering the feed deposited on the plate onto the ground, means operable by the weight of the fowl for actuating said toothed feed receiving wheel and scattering means, said last mentioned means comprising a shaft on which the toothed feed receiving wheel is mounted, a ratchet wheel on said shaft, a depressible bar, a treadle on the forward end of the bar, a member connected at its lower end to the other end of the bar, and a pawl carried by the upper end of the member for cooperation with the ratchet wheel.

2. In a chicken feeder and exerciser of the class described, a frame, a feed hopper supported in the top of the frame, the bottom of the hopper being provided with a discharge opening, a compartment open at its front side and supported below the hopper and adapted for communication with the discharge end thereof, a toothed feed receiving wheel adapted for rotation within the compartment, a feed deposit plate supported on the frame below the discharge end of the compartment and onto which the feed is deposited after being discharged from the toothed wheel in the compartment, means operated by the weight of the fowl for actuating said toothed feed receiving wheel, said last mentioned means comprising a shaft on which the toothed feed receiving wheel is mounted, a ratchet wheel on said shaft, a depressible bar, a treadle on the forward end of the bar, a member connected at its lower end to the other end of the bar, a pawl carried by the upper end of the member for co-operation with the ratchet wheel, an additional shaft disposed vertically through the compartment, intermeshing gearing connecting the shafts together, and a blade secured on the additional shaft for scraping engagement with the upper face of the rigid deposit plate for scattering the feed deposited thereon onto the ground.

3. In a chicken feeder and exerciser of the class described, a frame, a feed hopper supported in the top of the frame, a compartment communicating with the discharge end of the hopper, a relatively large flat feed deposit plate rigidly supported on the frame below the compartment for receiving a quantity of feed discharged from the compartment, means within the compartment for discharging a predetermined quantity of feed therefrom, a vertical rotatable shaft, a deflector member secured on the shaft below the discharge end of the compartment for distributing the feed onto the outer edge portion of the stationary deposit plate, the deflector member being of a diameter smaller than the feed deposit plate and having its sides bent downwardly, cooperating means between the shaft and the feed deposit plate for scattering the feed onto the ground, and means operable by the weight of the fowl for actuating said shaft.

In testimony whereof I affix my signature.

WALTER HARMS.